Figure 1:
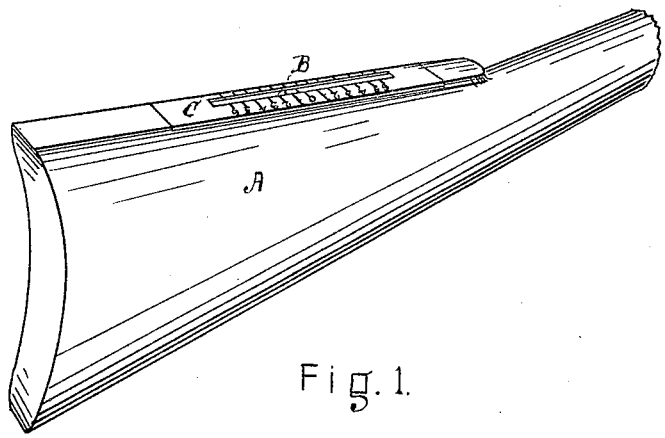
Figure 2:
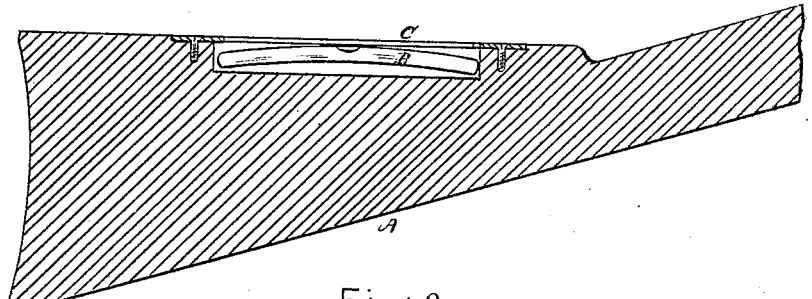

A. G. HASKELL.
GUN-SIGHT.

No. 175,702. Patented April 4, 1876.

WITNESSES
Frank G. Parker
Horace E. Morse

INVENTOR
Asa G. Haskell
by J. H. Adams
Atty.

UNITED STATES PATENT OFFICE.

ASA G. HASKELL, OF NORTH ANDOVER, MASSACHUSETTS.

IMPROVEMENT IN GUN-SIGHTS.

Specification forming part of Letters Patent No. 175,702, dated April 4, 1876; application filed March 1, 1876.

*To all whom it may concern:*

Be it known that I, ASA G. HASKELL, of North Andover, in the county of Essex and State of Massachusettts, have invented a Device for Establishing the Range of a Fire-Arm, of which the following is a specification:

The object of my invention is to provide a means for establishing the correct range of a fire-arm, so that when once determined by a sight at the object aimed at, the same range in a vertical plane may at any time be again determined by a person standing in the same position, although the position of the fire-arm be changed for loading or any other purpose, even though the object aimed at be obscured from the sight by the smoke arising from the discharge of the piece, or by fog or darkness The invention consists in the attachment to a fire-arm of a graduated spirit-level, so that when once the sight of an object aimed at is ascertained, the position of the fire-arm in a vertical plane will be determined by the bubble in the spirit-level, as indicated by a graduated scale attached or marked on the same, and in case of the obscuration of the sight, the aim may be determined by simply bringing the bubble to the graduated position in the spirit-level previously ascertained, without the necessity of sighting along the barrel of the fire-arm.

The accompanying drawing represents my invention as applied to the stock of an ordinary fire-arm.

The invention may be readily applied to any ordinary gun already finished without injury to its appearance or capacity for use.

A represents the stock of a fire-arm as ordinarily constructed of wood. On its upper portion, in a position most convenient to the eye when sighting the gun, is a cavity in which is secured a spirit-level, B, which is represented as bent in the arc of a circle, by means of which the bubble may be brought more readily in position than if a straight level were used. Over the level is placed a graduated scale, C, the graduations of which may be definitely fixed to indicate the particular range of a distant object as ascertained by experiment. The graduations may be marked directly on the spirit-level.

As an illustration of the applicability of my invention, I will refer to its application to firearms used in battle. After aim has been taken and a volley fired, the view is obscured so that further aim cannot well be immediately taken, in which case the continued firing is necessarily made at random.

By means of my invention it will be seen that when the first aim is taken upon the object sighted, the range may at once be determined by means of the graduated spirit-level, and the same may be subsequently maintained at each volley fired by simply bringing the bubble in the spirit-level to the proper mark on the graduated scale.

In the same way a fire-arm may be discharged at any desired object during a fog, or at night, the desired range having been previously ascertained when the object was visible.

The graduated spirit-level, instead of being placed, as shown, in the top of the stock, may be attached to any other part of the fire-arm, when the desired result may be attained. It may also be attached to ordnance.

I claim as my invention—

The combination, with a fire-arm, of a graduated spirit-level for determining the range of the fire-arm, substantially as specified.

In testimony whereof I have signed my name to this specification in the presence of two subscribing witnesses.

ASA G. HASKELL.

Witnesses:
J. H. ADAMS,
E. A. STOCK.